United States Patent Office 2,884,393
Patented Apr. 28, 1959

2,884,393

ORGANOSILICON COMPOSITIONS CONTAINING BETA-DICARBONYL ZIRCONIUM COMPOUNDS AND LEATHER ARTICLE TREATED THEREWITH

John W. Gilkey, Midland, Mich., assignor to Dow Corning Corporation, Midland, Mich., a corporation of Michigan No Drawing. Application January 23, 1957
Serial No. 635,617

6 Claims. (Cl. 260—29.1)

This invention relates to compositions comprising organosiloxanes and zirconium compounds.

It is known from United States Patent 2,728,736 that zirconium esters can be mixed with certain organosilicon compounds to produce compositions which are highly useful in rendering leather water repellent. It has been found that any zirconium ester of the type $Zr(OR)_4$ or partial hydrolyzates of such compounds can be employed in conjunction with the defined siloxanes for the purpose of preparing water repellent leather.

However, it has also been found that leather impregnated with the compositions of said patent has a surface which is extremely difficult to coat with standard leather finishes. Furthermore, the impregnated leather has a whitish, often sticky deposit on the surface so that even unfinished leather such as that employed in work shoes has an undesirable appearance.

It is the object of this invention to provide compositions of matter containing zirconium which impart a high degree of water repellency to leather without spoiling the appearance of the leather. Another object is to provide a water repellent leather which can be satisfactorily finished with standard organic finishes. Other objects and advantages will be apparent from the following description.

This invention relates to compositions of matter comprising (1) from 15 to 50% by weight of a compound of the formula

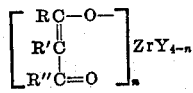

in which R is an aliphatic hydrocarbon radical, R' is of the group aliphatic hydrocarbon radicals and hydrogen, R'' is of the group aliphatic hydrocarbon radicals and aliphatic hydrocarbonoxy radicals, n has a value from .75 to 4 inclusive and Y is of the group aliphatic hydrocarbonoxy radicals and oxygen atoms, (2) from 5 to 70% by weight of a methylpolysiloxane resin composed of trimethylsiloxy units and $SiO_2$ units in such proportion that the ratio of methyl radicals to silicon atoms is from 1:1 to 1.5:1 and (3) from 5 to 80% by weight of polysiloxanes having the general formula

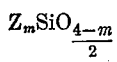

in which Z is a hydrocarbon radical of less than 7 carbon atoms and m has an average value from 2 to 2.9 inclusive.

The novel feature of the compositions of this invention is the use of zirconium compounds having at least .75 beta-dicarbonyl residues per zirconium atom. These compounds are prepared by adding beta-dicarbonyl compounds such as beta-diketones and beta-keto esters to reactive zirconium compounds such as zirconium or zirconyl esters of aliphatic alcohols or inorganic zirconyl compounds such as zirconyl chloride.

Reaction occurs spontaneously upon mixing the beta-dicarbonyl compound and the reactive zirconium compound. The reaction is believed to proceed by an interaction between the enol forms of the beta-dicarbonyl compounds and the zirconium compound in accordance with the equation

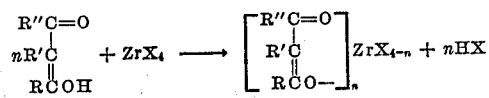

where the X's are the reactive groups such as alkoxyl, chlorine, etc. It is further believed that the beta-dicarbonyl esters of the zirconium compounds form chelates; that is, it is believed that one of the oxygen atoms is directly attached to a zirconium atom through a primary valence bond and the other is bonded to the zirconium atom through a coordinate linkage. It should be understood that applicant's invention is not limited by the above explanations.

It is essential for the purpose of this invention that the zirconium compound (1) should contain an average of at least .75 of the beta-dicarbonyl groups per zirconium atom. When the amount of the dicarbonyl compound is below this an unsatisfactory finish is obtained on the leather.

Those zirconium compounds (1) in which Y is an aliphatic hydrocarbonoxy radical are prepared by reacting any beta-diketone of the formula $RC=OCHR'C=OR$ and any beta-keto ester of the formula

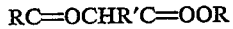

$RC=OCHR'C=OOR$ in which the R groups are any aliphatic hydrocarbon radical such as methyl, ethyl, butyl, octadecyl, allyl, isopropyl, or sec.-amyl and R' is hydrogen, or any aliphatic hydrocarbon radical such as methyl, ethyl, propyl, isobutyl, allyl, or octadecyl, with any zirconium compound of the formula $Zr(OR)_4$ in which R is as above defined. This reaction occurs spontaneously upon mixing the dicarbonyl compound with the zirconium ester and is evidenced by a warming up of the mixture. Y can be any aliphatic hydrocarbonoxy radical such as methoxy, ethoxy, butoxy, octadecyloxy, isopropoxy, allyloxy or sec.-amyloxy.

Those compounds (1) in which some or all of the Y's are oxygen (i.e. where the zirconate is partially condensed) can be prepared by one of two methods. One, they may be prepared by reacting the above beta-dicarbonyl compounds with a zirconyl compound such as zirconyl chloride. This reaction is best carried out in the presence of a hydrogen halide acceptor such as sodium carbonate. In addition, compounds (1) where Y is oxygen may be prepared by partially hydrolyzing those zirconium compounds where Y is hydrocarbonoxy.

In the preparation of the compositions of this invention zirconium compounds (1) can be mixed with siloxanes (2) and (3) by dissolving them in a mutual solvent such as toluene, xylene, methylene chloride or perchloroethylene. In addition, the compositions may be prepared by mixing a zirconium ester of the type $Zr(OR)_4$ or partial hydrolyzates thereof with siloxanes (2) and (3) in a mutual solvent and thereafter forming zirconium compound (1) in situ by adding an appropriate amount of the defined beta-dicarbonyl compounds. Under these conditions reaction will occur spontaneously between the dicarbonyl compound and the zirconium ester to produce zirconium compounds (1). The presence of the siloxanes (2) and (3) does not interfere with this reaction.

Organosiloxane resin (2) which is employed in this invention is a copolymer of trimethylsiloxane units and SiO₂ units. These copolymers may be prepared by any suitable method such as by cohydrolyzing trimethylchlorosilane and ethyl orthosilicate or by the method comprising reacting methylchlorosilanes, methylalkoxysilanes or hexamethyldisiloxane with an acidic silica sol.

Organopolysiloxanes (3) which are operative herein include those in which Z is any hydrocarbon radical having less than 7 carbon atoms such as phenyl, methyl, ethyl, propyl, vinyl, allyl and the like. Consequently specific examples of operative siloxanes (3) are dimethylsiloxane, vinylmethylsiloxane, vinylethylsiloxane, dipropylsiloxane, phenylmethylsiloxane, or any mixtures thereof and copolymers of any of these diorganosiloxanes with triorganosiloxanes such as trimethylsiloxane, phenyldimethylsiloxane, vinyldimethylsiloxane, hexenyldiethylsiloxane and amyldimethylsiloxane.

One of the primary uses of the compositions of this invention is that of rendering leather water repellent. This is accomplished preferably by employing a solvent solution of the siloxane in any solvents which are harmless to leather such as those specified above. Suitable results are obtained when the leather contains from .5 to 50% by weight of the composition of this invention. Preferably the leather contains from 2 to 25% by weight of the composition.

The composition may be applied to the leather in any desired manner such as by dipping, spraying and brushing. The compositions are applicable to any leather either tanned, tawed or otherwise cured and to either finished or unfinished leather. They are also applicable to leather from any type of animal such as horsehide, pigskin, kid, cowhide and the like.

Leather treated with the compositions of this invention does not show the whitish appearance and uneven surface of leather treated with the heretofore employed zirconium-silicone compositions. Furthermore, leather treated with the compositions of this invention can be finished in the conventional manner with standard organic finishes which are at present commercially available. These finishes can be applied in the ordinary manner. By contrast, finishes do not adhere satisfactorily to the surfaces of leather which has been impregnated with the zirconium compositions described in the aforesaid patent.

The compositions of this invention are also useful as water repellent agents for glass, ceramic and other surfaces.

The following examples are illustrative only and should not be construed as limiting the invention which is properly set forth in the appended claims.

The water repellency of the leather in the following examples was determined by measuring the number of flexes required for the water to penetrate in accordance with the tests described in U.S. Patent 2,728,736.

*Example 1*

Siloxane A employed in these examples was a copolymer of trimethylsiloxane units and SiO₂ units having a methyl to silicon ratio of 1.2:1.

Siloxane B employed herein was a trimethylsiloxy end-blocked dimethylpolysiloxane fluid of 350 cs.

Equal parts by weight of siloxanes A, B and a partially condensed octyl zirconate were dissolved in perchloroethylene to give 15% by weight solids. These solutions were divided into several portions and to each was added the amount of acetylacetone shown in the table below. Each solution was then employed for impregnating pieces of leather of the type known as unfinished Rueping Tomahawk Kip. In each case the leather was dipped into the solution and allowed to become saturated and was thereafter removed and dried. The number of flexes required for water to penetrate each piece was determined and the surface appearance of the leather was noted.

| Run | Mol ratio of acetylacetone to Zr | Average pickup in percent by wt. of the leather | Surface condition of the leather | Penetration in flexes |
|---|---|---|---|---|
| 1 | 0 | 16.3 | Sticky | >4,000 |
| 2 | .5:1 | 15.1 | ___do___ | >4,000 |
| 3 | 1:1 | 15.8 | Satisfactory | >4,000 |
| 4 | 2:1 | 13.5 | ___do___ | >4,000 |
| 5 | 4:1 | 14.6 | ___do___ | >4,000 |

*Example 2*

A solution was prepared by dissolving in perchloroethylene equal parts by weight of siloxanes A, B (of Example 1) and a partially condensed octyl zirconate. Acetylacetone was then added to the solution in amount to give 2 mols of acetylacetone per zirconium atom. The solution was diluted to 15% by weight solids and was used to impregnate Eagle-Ottawa Natural unfinished leather. The leather was dried and each sample was found to have a water penetration of greater than 4000 flexes over a pickup range of from 1.3 to 12.5% by weight solids based on the weight of the leather. In each case the surface of the leather was free of stickiness. A satisfactory finish was applied to the leather as follows:

The surface of the sample was coated with a composition comprising 60% by weight water, 20% by weight propylene glycol, 10% by weight of a methyl methacrylate resin and 10% by weight of a black pigment. This coat was allowed to dry and the surface was then treated with a second coat comprising 55.6% by weight water, 11.1% by weight of a casein-shellac solution, 5.5% by weight carnauba wax, 13.9% by weight of a methyl methacrylate resin, and 13.9% by weight pigment. The second coating was dried and the samples were finely treated with top coating comprising 50% by weight nitrocellulose lacquer and 50% by weight water. The top coat was dried and the leather samples were pressed between metal plates at 500 p.s.i. and heated at 160° F. for a few seconds. The resulting finishes were smooth and adhered to the leather.

The above treatment is a standard commercial treatment and each of the coatings represents a standard commercial product recommended for finishing leather.

A control piece of leather treated with a mixture of siloxanes A, B and partially condensed octyl zirconate did not give a satisfactory finish under identical conditions due to poor wetting and to peeling when the leather was plated.

*Example 3*

Equivalent results were obtained when butyl zirconate was employed in the procedure of Example 2.

*Example 4*

Equal parts by weight of siloxanes A, B of Example 1 and octyl zirconate were dissolved in perchloroethylene in amount to give a 15% by weight solution. Ethyl acetoacetate was added to this solution in amount to give 2 mols of the ethyl acetoacetate per mol of zirconium. Both Rueping Tomahawk Kip and Eagle-Ottawa Natural unfinished leather were impregnated with this composition. In each case the leather showed a penetration of greater than 4000 flexes and in each case the leather was satisfactorily finished according to the process of Example 2.

*Example 5*

The compound

was prepared as follows. 5.8 parts by weight ZrCl₃.8H₂O was dissolved in 50 parts by weight water and this solution was mixed with a solution of 10 parts by weight acetylacetone in 50 parts by weight of a 10% aqueous sodium carbonate solution. The mixture was cooled to give a crystalline product which was then filtered and dissolved in benzene. Petroleum ether was added to the benzene solution to precipitate the tetra-acetylacetone zirconate.

Five parts by weight each of siloxanes A, B of Example 1 and 2.1 parts by weight of the tetra-acetylacetone zirconate were dissolved in perchloroethylene. The solution was then employed to impregnate leather as in Example 1. The leather was then dried and was found to have a water repellency of greater than 4000 flexes. It could be easily finished with the finish of Example 2.

*Example 6*

Equivalent results are obtained when the following compounds are substituted for the acetylacetone employed in Example 1:

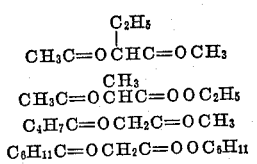

*Example 7*

Equivalent results are obtained when the following siloxanes are substituted for siloxane B in Example 1:

A copolymer of 75 mol percent dimethylsiloxane and 25 mol percent phenylmethylsiloxane,
Vinylmethylsiloxane,
Diethylsiloxane,
Butylmethylsiloxane, and
Allylmethylsiloxane.
A copolymer of vinyldimethylsiloxane and dimethylsiloxane.
A copolymer of phenyldimethylsiloxane and dimethylsiloxane.

*Example 8*

Equivalent results are obtained when the following zirconium compounds are employed in the procedure of Example 1:

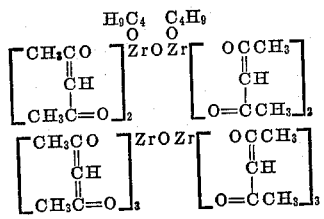

That which is claimed is:

1. A composition of matter comprising (1) from 15 to 50% by weight of a compound of the formula

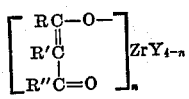

in which R is an aliphatic hydrocarbon radical, R' is selected from the group consisting of aliphatic hydrocarbon radicals and hydrogen atoms, R" is selected from the group consisting of aliphatic hydrocarbon radicals and aliphatic hydrocarbonoxy radicals, $n$ has a value from .75 to 4 inclusive and Y is selected from the group consisting of aliphatic hydrocarbonoxy radicals and oxygen atoms, (2) from 5 to 70% by weight of a methylpolysiloxane resin composed of trimethylsiloxy units and $SiO_2$ units in such proportion that the ratio of methyl radicals to silicon atoms is from 1:1 to 1.5:1 and (3) from 5 to 80% by weight of a polysiloxane having the general formula

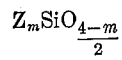

in which Z is a hydrocarbon radical of less than 7 carbon atoms and $m$ has an average value from 2 to 2.9 inclusive.

2. A composition of matter comprising (1) from 15 to 50% by weight of compounds of the formula

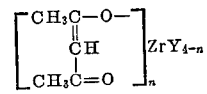

and partial hydrolyzates thereof in which Y is an aliphatic hydrocarbonoxy radical and $n$ has a value from .75 to 4 inclusive, (2) from 5 to 70% by weight of a methylpolysiloxane resin composed of trimethylsiloxy units and $SiO_2$ units in such proportion that the ratio of methyl radicals to silicon atoms is from 1:1 to 1.5:1, and (3) from 5 to 80% by weight of a methylpolysiloxane fluid having an average of from 2 to 2.9 inclusive methyl groups per silicon atom.

3. A composition of matter comprising (1) from 15 to 50% by weight of a compound of the formula

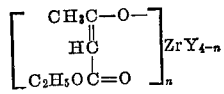

and partial hydrolyzates thereof in which $n$ has a value from .75 to 4 inclusive and Y is an aliphatic hydrocarbonoxy radical, (2) from 5 to 70% by weight of a methylpolysiloxane resin composed of trimethylsiloxy units and $SiO_2$ units in such proportion that the ratio of methyl radicals to silicon atoms is from 1:1 to 1.5:1, and (3) from 5 to 80% by weight of a methylpolysiloxane fluid having an average of from 2 to 2.9 inclusive methyl radicals per silicon atom.

4. A leather article impregnated with the composition of claim 1.

5. A leather article impregnated with the composition of claim 2.

6. A leather article impregnated with the composition of claim 3.

References Cited in the file of this patent
UNITED STATES PATENTS
2,728,736   Hunter et al. _____ Dec. 27, 1955

UNITED STATES PATENT OFFICE
Certificate of Correction

Patent No. 2,884,393 April 28, 1959

John W. Gilkey

It is hereby certified that error appears in the printed specification of the above numbered patent requiring correction and that the said Letters Patent should read as corrected below.

Column 5, lines 46 to 50, Example 8, the second compound should appear as shown below instead of as in the patent—

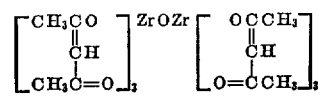

Signed and sealed this 1st day of September 1959.

[SEAL]

Attest:
KARL H. AXLINE,
*Attesting Officer.*

ROBERT C. WATSON,
*Commissioner of Patents.*